US008902622B2

(12) United States Patent
Suzuki et al.

(10) Patent No.: US 8,902,622 B2
(45) Date of Patent: Dec. 2, 2014

(54) POWER SUPPLY APPARATUS

(75) Inventors: Akihiro Suzuki, Chiyoda-ku (JP); Hitoshi Kidokoro, Chiyoda-ku (JP); Toshiki Koshimae, Chiyoda-ku (JP); Hiroshi Kurushima, Chiyoda-ku (JP); Masato Matsubara, Chiyoda-ku (JP); Naoki Nishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/518,350

(22) PCT Filed: Sep. 7, 2011

(86) PCT No.: PCT/JP2011/070370
§ 371 (c)(1), (2), (4) Date: Jun. 21, 2012

(87) PCT Pub. No.: WO2012/046534
PCT Pub. Date: Apr. 12, 2012

(65) Prior Publication Data

US 2012/0257431 A1 Oct. 11, 2012

(30) Foreign Application Priority Data

Oct. 6, 2010 (JP) ................................ 2010-226964

(51) Int. Cl.
*H02M 7/5387* (2007.01)
*H02M 7/00* (2006.01)
*H02M 7/217* (2006.01)

(52) U.S. Cl.
CPC .................................... *H02M 7/003* (2013.01)
USPC ............................ 363/132; 363/127; 363/146

(58) Field of Classification Search
USPC .......................... 363/125-127, 131-132, 146
See application file for complete search history.

(56) References Cited

U.S. PATENT DOCUMENTS 3,882,370 A * 5/1975 McMurray .................... 363/135
7,046,523 B2 * 5/2006 Sun et al. ........................ 363/17

(Continued)

FOREIGN PATENT DOCUMENTS

JP 61-251480 A 11/1986
JP 06-037375 A 2/1994

(Continued)

OTHER PUBLICATIONS

Chinese Office Action dated Apr. 23, 2014 issued in Chinese Application No. 201180005476.9.
(Continued)

*Primary Examiner* — Adolf Berhane
*Assistant Examiner* — Henry Lee, III
(74) *Attorney, Agent, or Firm* — Sughrue Mion, PLLC

(57) ABSTRACT

A power supply apparatus includes an inverter having output terminals; a first transformer that transforms AC output from the output terminals; a second transformer that is connected to the output terminals in parallel to the first transformer, arranged on an opposite side of the first transformer with respect to a straight line passing through a center of the output terminals and extending perpendicularly to a plane including the output terminals, and transforms AC power output from the output terminals; first conductive lines that connect the output terminals to both ends of the first transformer; and second conductive lines that connect the output terminals to both ends of the second transformer. An area of a first loop formed by the inverter, the first conductive lines, and the first transformer is equal to an area of a second loop formed by the inverter, the second conductive lines, and the second transformer.

8 Claims, 7 Drawing Sheets

(56) References Cited

U.S. PATENT DOCUMENTS

| | | |
|---|---|---|
| 2007/0223256 A1 | 9/2007 | Kidokoro et al. |
| 2007/0223258 A1* | 9/2007 | Lai et al. .................. 363/37 |
| 2010/0254168 A1* | 10/2010 | Chandrasekaran ......... 363/37 |

FOREIGN PATENT DOCUMENTS

| | | |
|---|---|---|
| JP | 09-215181 A | 8/1997 |
| JP | 3292229 B2 | 3/2002 |
| JP | 2003-125586 A | 4/2003 |
| JP | 2003-243749 A | 8/2003 |
| JP | 2004-080891 A | 3/2004 |
| JP | 2009-194954 A | 8/2009 |
| WO | 2005/104343 A1 | 11/2005 |

OTHER PUBLICATIONS

Chinese Office Action, dated May 14, 2013, CN Appln No. 201180005476.9.

* cited by examiner

US 8,902,622 B2

POWER SUPPLY APPARATUS

CROSS REFERENCE TO RELATED APPLICATION

This application is a National Stage of International Application No. PCT/JP2011/070370, filed on Sep. 7, 2011, which claims priority from Japanese Patent Application No. 2010-226964, filed Oct. 6, 2010, the contents of all of which are incorporated herein by reference in their entirety.

FIELD

The present invention relates to a power supply apparatus.

BACKGROUND

Patent Literature 1 describes a technique in which, in a power supply apparatus of a gas-laser oscillator, an alternating-current voltage of a commercial power supply is converted into a direct-current voltage in a converter unit and input to an inverter unit, the direct-current voltage is converted into a square-wave alternating-current voltage in the inverter unit including a switching device and a free wheeling diode, and an output voltage of the inverter unit is boosted by a high-frequency transformer with inductance and applied between dielectric electrodes, so that a discharge occurs between the dielectric electrodes. In this power supply apparatus, a reactor is connected in parallel to the high-frequency transformer on an output side of the inverter unit. Therefore, according to Patent Literature 1, because a recovery current flowing in the free wheeling diode in the inverter unit can be reduced when any discharge does not occur between the dielectric electrodes, it is supposed that heat generation of the free wheeling diode can be suppressed.

Patent Literature 2 describes a technique in which, in a laser power supply apparatus, a rectifying unit rectifies a commercial alternating-current power supply, the rectified voltage is smoothened into a direct-current voltage and boosted by a step-up converter unit, the boosted direct-current voltage is converted into a high-frequency voltage by an inverter unit, and the high-frequency voltage is boosted to a voltage to be applied to a discharge electrode unit for laser excitation by a step-up transformer. Therefore, according to Patent Literature 2, because a turns ratio (a boost ratio) of the step-up transformer can be reduced by boosting the commercial alternating-current power supply by the step-up converter unit, it is supposed that a secondary-side leakage inductance that is proportional to a square of a secondary-side number-of-turns can be reduced.

Patent Literature 3 describes a technique in which, in a direct-current power supply apparatus, a rectifier rectifies an alternating-current input power supply into a direct-current voltage and inputs the direct-current voltage to an inverter, the inverter converts the direct-current voltage into a high-frequency voltage, and the high-frequency voltage is applied to primary windings of two isolation transformers connected in parallel to each other and to two windings of a coupling transformer. According to this direct-current power supply apparatus, the two windings of the coupling transformer magnetically couple an input current path of one polarity of the primary winding of one of the two isolation transformers to an input current path of the other polarity of the primary winding of another isolation transformer at a turns ratio of one. Therefore, according to Patent Literature 3, equal currents flow in the two windings of the coupling transformer in a forcible manner and equal currents flow in the respective primary windings of the two isolation transformers in a forcible manner, and thus it is supposed that the currents of the isolation transformers are balanced.

CITATION LIST

Patent Literatures

Patent Literature 1: International Publication No. WO 2005/104343
Patent Literature 2: Japanese Patent Application Laid-open No. 2003-243749
Patent Literature 3: Japanese Patent Application Laid-open No. 9-215181

SUMMARY

Technical Problem

Patent Literature 1 and Patent Literature 2 do not include any description about a configuration of connecting a plurality of step-up transformers (transformers) in parallel to each other on an output side of an inverter unit.

According to the invention of Patent Literature 3, a coupling transformer needs to be newly and additionally provided between an inverter and two isolation transformers for current balancing of the two isolation transformers (transformers). Accordingly, the direct-current power supply apparatus tends to be large-sized.

The present invention has been achieved in view of the above problems, and object of the present invention is to provide a power supply apparatus that can equalize a current balance between two transformers without adding any device for current balancing.

Solution to Problem

There is provided a power supply apparatus including: an inverter that includes a group of output terminals, generates alternating-current power from direct-current power, and outputs generated power from the group of output terminals; a first transformer that transforms alternating-current power output from the group of output terminals; a second transformer that is connected to the group of output terminals in parallel to the first transformer, arranged on an opposite side of the first transformer with respect to a straight line passing through a center of the group of output terminals and extending perpendicularly to a plane including the group of output terminals, and transforms alternating-current power output from the group of output terminals; a plurality of first conductive lines that connect the group of output terminals and both ends of the first transformer; and a plurality of second conductive lines that connect the group of output terminals and both ends of the second transformer, wherein an area of a first loop formed by the inverter, the first conductive lines, and the first transformer is equal to an area of a second loop formed by the inverter, the second conductive lines, and the second transformer.

Advantageous Effects of Invention

According to the present invention, an inductance of a current path between the inverter and the first transformer can be equal to an inductance of a current path between the inverter and the second transformer, and thus a current balance of the first transformer and the second transformer can be equal. That is, the current balance of two transformers can be equal without adding any device for current balancing.

DESCRIPTION OF EMBODIMENTS

Exemplary embodiments of a power supply apparatus according to the present invention will be explained below in detail with reference to the accompanying drawings. The present invention is not limited to the embodiments.

First Embodiment

Figure 2:
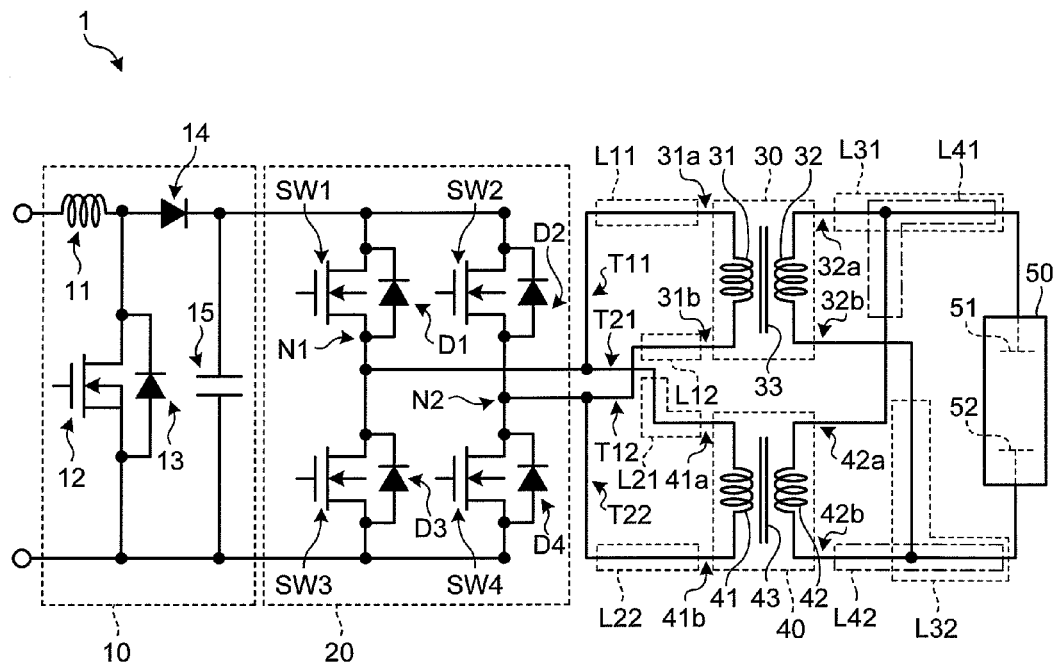
FIG. 2 depicts a configuration of the power supply apparatus according to the first embodiment.

A circuit configuration of a power supply apparatus 1 according to a first embodiment is explained with reference to FIG. 2. FIG. 2 depicts the circuit configuration of the power supply apparatus 1.

The power supply apparatus 1 externally receives alternating-current power to generate high-frequency power from the alternating-current power and applies it to both ends of a load device 50. The load device 50 includes a pair of electrodes 51 and 52, for example. That is, the power supply apparatus 1 applies the high-frequency power between the pair of the electrodes 51 and 52, so that a discharge occurs between the pair of the electrodes 51 and 52. The pair of the electrodes 51 and 52 is a pair of discharge electrodes in a gas-laser oscillator, for example.

The power supply apparatus 1 includes a boost chopper circuit (a converter) 10, an inverter 20, conductive lines (a plurality of first conductive lines) L11 and L12, conductive lines (a plurality of second conductive lines) L21 and L22, a transformer (a first transformer) 30, a transformer (a second transformer) 40, conductive lines (a plurality of third conductive lines) L31 and L32, and conductive lines (a plurality of fourth conductive lines) L41 and L42. According to this power supply apparatus 1, the transformer 30 and the transformer 40 are connected in parallel to each other on an output side of the inverter 20. The transformer 30 and the transformer 40 are connected in parallel to each other to respective ends of the load device 50.

The boost chopper circuit 10 generates direct-current power boosted from externally received alternating-current power (for example, commercial alternating-current power-supply power). The boost chopper circuit 10 includes a reactor 11, a switching device 12, a diode 13, a diode 14, and a capacitor 15. During a period in which the switching device 12 is switched on, the reactor 11 stores energy according to a flown current. When the switching device 12 is switched off, the reactor 11 releases the stored energy. At this time, the diode 14 receives alternating-current power obtained by adding that energy to the externally received alternating-current power, that is, boosted alternating-current power and converts the boosted alternating-current power into boosted direct-current power. The capacitor 15 smoothens the converted direct-current power and outputs the smoothened power to the inverter 20.

The inverter 20 generates high-frequency power (alternating-current power) from the direct-current power received from the boost chopper circuit 10 and outputs it from a group of output terminals T11 to T22. The inverter 20 includes a plurality of switching devices SW1 to SW4 and a plurality of diodes D1 to D4. For example, during a period in which the switching devices SW1 and SW4 are switched on and the switching devices SW2 and SW3 are switched off, a current from an output node N1 to the output terminals T11 and T21 and a current from the output terminals T12 and T22 to an output node N2 are generated. For example, during a period in which the switching devices SW2 and SW3 are switched on and the switching devices SW1 and SW4 are switched off, a current from the output terminals T11 and T21 to the output node N1 and a current from the output node N2 to the output terminals T12 and T22 are generated.

The conductive lines L11 and L12 connect the group of the output terminals T11 to T22 and both ends 31a and 31b of a primary-side coil 31 of the transformer 30 to be explained later. For example, the conductive line L11 connects the output terminal T11 of the inverter 20 (the output node N1) and one end 31a of the primary-side coil 31. The conductive line L12 connects the output terminal T12 of the inverter 20 (the output node N2) and the other end 31b of the primary-side coil 31.

The conductive lines L21 and L22 connect the group of the output terminals T11 to T22 and both ends 41a and 41b of a primary-side coil 41 of the transformer 40 to be explained later. For example, the conductive line L21 connects the output terminal T11 of the inverter 20 (the output node N1) and one end 41a of the primary-side coil 41. The conductive line L22 connects the output terminal T12 of the inverter 20 (the output node N2) and the other end 41b of the primary-side coil 41.

The transformer 30 is connected to the group of the output terminals T11 to T22 in parallel to the transformer 40. The transformer 30 boosts high-frequency power received from the inverter 20 via the conductive lines L11 and L12 and applies the received power to both ends of the load device 50 (the pair of the electrodes 51 and 52) via the conductive lines L31 and L32. The transformer 30 includes the primary-side coil 31 and a secondary-side coil 32. The transformer 30 receives the high-frequency power from the inverter 20 at the both ends 31a and 31b of the primary-side coil 31 and boosts the high-frequency power at a boost ratio according to a turns ratio of the primary-side coil 31 to the secondary-side coil 32. The transformer 30 applies the boosted high-frequency power from both ends 32a and 32b of the secondary-side coil 32 to the both ends of the load device 50 via the conductive lines L31 and L32. The transformer 30 can also include an iron core 33. In this case, the transformer 30 boosts the high-frequency power received at the both ends 31a and 31b of the primary-side coil 31 via the iron core 33 and generates the boosted high-frequency power at the both ends 32a and 32b of the secondary-side coil 32.

The transformer 40 is connected to the group of the output terminals T11 to T22 in parallel to the transformer 30. The transformer 40 boosts the high-frequency power received from the inverter 20 via the conductive lines L21 and L22 and applies the received power to the both ends of the load device 50 (the pair of the electrodes 51 and 52) via the conductive lines L41 and L42. The transformer 40 includes the primary-side coil 41 and a secondary-side coil 42. The transformer 40 receives the high-frequency power from the inverter 20 at the both ends 41a and 41b of the primary-side coil 41 and boosts the high-frequency power at a boost ratio according to a turns ratio of the primary-side coil 41 to the secondary-side coil 42. The transformer 40 applies the boosted high-frequency power from the both ends 42a and 42b of the secondary-side coil 42 to the both ends of the load device 50 via the conductive lines L41 and L42. The transformer 40 can also include an iron core 43. In this case, the transformer 40 boosts the high-frequency power received at the both ends 41a and 41b of the primary-side coil 41 via the iron core 43 and generates the boosted high-frequency power at the both ends 42a and 42b of the secondary-side coil 42.

The conductive lines L31 and L32 connect the both ends 32a and 32b of the secondary-side coil 32 of the transformer 30 and the both ends of the load device 50 (the pair of the electrodes 51 and 52). For example, the conductive line L31 connects one end 32a of the secondary-side coil 32 and the electrode 51. The conductive line L32 connects the other end 32b of the secondary-side coil 32 and the electrode 52.

The conductive lines L41 and L42 connect the both ends 42a and 42b of the secondary-side coil 42 of the transformer 40 and the both ends of the load device 50 (the pair of the electrodes 51 and 52). For example, the conductive line L41 connects one end 42a of the secondary-side coil 42 and the electrode 51. The conductive line L42 connects the other end 42b of the secondary-side coil 42 and the electrode 52.

Figure 1:
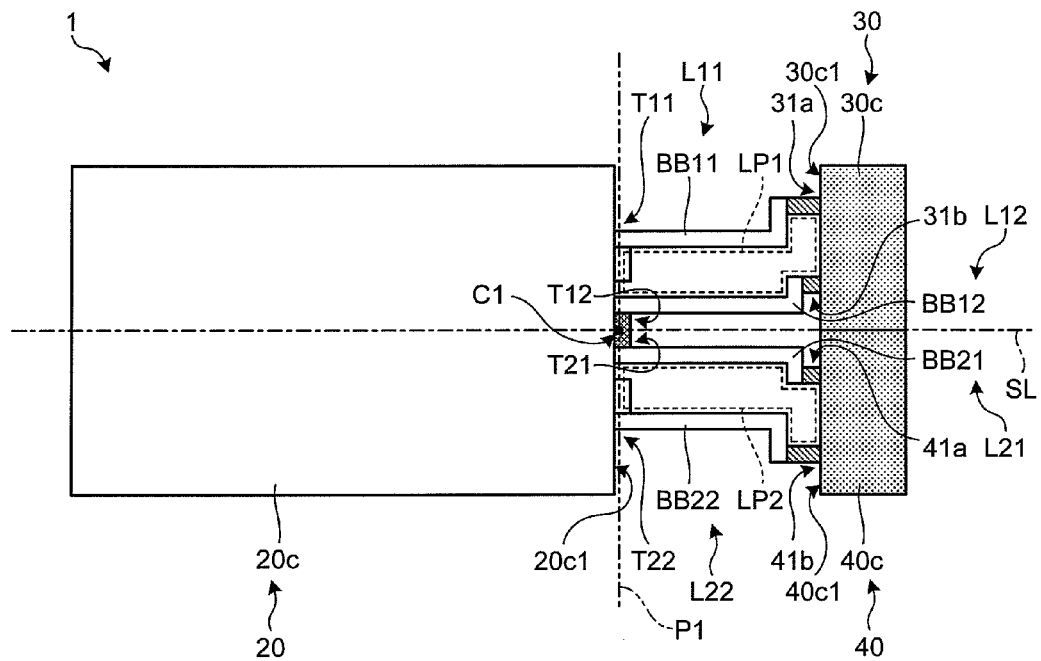
FIG. 1 depicts a configuration of a power supply apparatus according to a first embodiment.

Next, an external configuration of the power supply apparatus 1 according to the first embodiment is explained with reference to FIG. 1. FIG. 1 is a plan view of a part of the external configuration of the power supply apparatus 1.

FIG. 1 depicts the external configuration for the inverter 20, the transformer 30, the transformer 40, the conductive lines L11 and L12, and the conductive lines L21 and L22 in the configuration shown in FIG. 2.

As shown in FIG. 1, for example, the inverter 20 includes a substantially rectangular parallelepiped casing 20c. The switching devices SW1 to SW4 and the diodes D1 to D4 (see FIG. 2) are incorporated in the casing 20c. The group of the output terminals T11 to T22 is arranged on a surface 20c1 of the casing 20c, where the surface 20c1 faces the transformer 30 and the transformer 40. That is, a plane P1 along the surface 20c1 includes the group of the output terminals T11 to T22 and a center C1 of the group of the output terminals T11 to T22.

The transformer 30 and the transformer 40 are arranged on respective sides of a straight line (an imaginary line) SL that passes through the center C1 of the group of the output terminals T11 to T22 and extends perpendicularly to the plane P1.

The transformer 30 is arranged on the opposite side of the transformer 40 with respect to the straight line SL. The transformer 30 includes a substantially rectangular parallelepiped casing 30c, for example. The primary-side coil 31 and the secondary-side coil 32 (see FIG. 2) are incorporated in the casing 30c. The connection terminals 31a and 31b to both ends of the primary-side coil 31 are arranged on a surface 30c1 of the casing 30c, where the surface 30c1 faces the inverter 20.

The transformer 40 is arranged on the opposite side of the transformer 30 with respect to the straight line SL. The transformer 40 includes a substantially rectangular parallelepiped casing 40c, for example. The primary-side coil 41 and the secondary-side coil 42 (see FIG. 2) are incorporated in the casing 40c. The connection terminals 41a and 41b to both ends of the primary-side coil 41 are arranged on a surface 40c1 of the casing 40c, where the surface 40c1 faces the inverter 20.

The conductive lines L11 and L12 include bus bars BB11 and BB12, for example. Each of the bus bars BB11 and BB12 is a bar-shaped member made of a conductor such as metal. The bus bar BB11 connects the output terminal T11 of the inverter 20 and the connection terminal 31a of the transformer 30. The bus bar BB12 connects the output terminal T12 of the inverter 20 and the connection terminal 31b of the transformer 30. That is, the inverter 20 and the transformer 30 are connected by two bus bars BB11 and BB12. These two bus bars BB11 and BB12 extend alongside from the inverter 20 to the transformer 30. Correspondingly, as shown by a broken line in FIG. 1, a loop LP1 is formed by the inverter 20, the bus bars BB11 and BB12, and the transformer 30.

The conductive lines L21 and L22 include bus bars BB21 and BB22, for example. Each of the bus bars BB21 and BB22 is a bar-shaped member made of a conductor such as metal. The bus bar BB21 connects the output terminal T21 of the inverter 20 and the connection terminal 41a of the transformer 40. The bus bar BB22 connects the output terminal T22 of the inverter 20 and the connection terminal 41b of the transformer 40. That is, the inverter 20 and the transformer 40 are connected by the two bus bars BB21 and BB22. These two bus bars BB21 and BB22 extend alongside from the inverter 20 to the transformer 40. Correspondingly, as shown by a broken line in FIG. 1, a loop LP2 is formed by the inverter 20, the bus bars BB21 and BB22, and the transformer 40.

As shown in FIG. 1, the transformer 30 and the transformer 40 are connected in parallel to each other on the output side of the inverter 20 and arranged on the respective sides of the straight line (the imaginary line) SL. Correspondingly, the loop LP1 and the loop LP2 are also arranged on the respective sides of the straight line SL. The area of the loop LP1 is equal to the area of the loop LP2.

The transformer 30 and the transformer 40 are arranged at positions on the respective sides of the straight line SL symmetrical to each other with respect to the straight line SL. The two bus bars BB11 and BB12 and the two bus bars BB21 and BB22 are arranged at positions on the respective sides of the straight line SL symmetrical to each other with respect to the straight line SL. Accordingly, the loop LP1 and the loop LP2 respectively have a shape symmetrical to each other with respect to the straight line SL (for example, a substantially L-shape).

It is assumed here that a coupling transformer that magnetically couples the conductive line L12 and the conductive line L21 by a turns ratio of one is provided for current balancing of the transformer 30 and the transformer 40. In this case, the coupling transformer is additionally provided between the inverter 20 and the bus bars BB12 and BB21 in the configuration shown in FIG. 1. Consequently, the power supply apparatus is extended in a direction along the straight line SL and tends to be large-sized.

On the other hand, according to the first embodiment, the transformer 30 and the transformer 40 are connected in parallel to each other on the output side of the inverter 20 and arranged on the respective sides of the straight line (the imaginary line) SL. Correspondingly, the loop LP1 and the loop LP2 are also arranged on the respective sides of the straight line SL. The area of the loop LP1 is equal to the area of the loop LP2. Therefore, an inductance of a current path between the inverter 20 and the transformer 30 can be equal to an inductance of a current path between the inverter 20 and the transformer 40. Accordingly, a current balance of the transformer 30 and the transformer 40 can be equal. That is, without adding any device for current balancing, the current balance of the two transformers 30 and 40 can be equal. Consequently, a flow of an excessive current in one of the two transformers 30 and 40 can be reduced and thus deteriorations in transformers because of heat generation caused by the excessive current (for example, deteriorations in coils and iron cores) can be reduced.

According to the first embodiment, the loop LP1 and the loop LP2 respectively have a shape symmetrical to each other with respect to the straight line SL (for example, a substantially L-shape). A floating inductance generated in each of the current loops (the loops LP1 and LP2) can be reduced to, for example, about ½.

Furthermore, because the loop LP1 and the loop LP2 respectively have a shape symmetrical to each other with respect to the straight line SL, the floating inductances, each of which is determined by a shape of a loop, of the respective loops on the respective sides of the straight line SL for electrodes can be equal to each other, and current deviation between the two loops can be easily reduced.

Because the loop LP1 and the loop LP2 respectively have a shape symmetrical to each other with respect to the straight line SL, members for forming the loop LP1 and the loop LP2, that is, the bus bars BB11 to BB22 and the connection terminals of the respective transformers can be standardized with respect to the straight line SL. Accordingly, the power supply apparatus can be easily manufactured so that the area of the loop LP1 is equal to the area of the loop LP2 and manufacturing costs of the power supply apparatus can be easily reduced.

Further, because the loop LP1 and the loop LP2 respectively have a shape symmetrical to each other with respect to the straight line SL, a magnetic field generated in the loop LP1 and a magnetic field generated in the loop LP2 can be generated so as to be equal to each other in opposite directions, so that they can cancel each other out. Accordingly, the inductance of the respective current loops (the loops LP1 and LP2) can be reduced.

According to the first embodiment, two bus bars extend alongside from an inverter to a transformer on each side of the straight line SL. That is, the two bus bars BB11 and BB12 extend alongside from the inverter 20 to the transformer 30 on one side of the straight line SL. The two bus bars BB21 and BB22 extend alongside from the inverter 20 to the transformer 40 on the other side of the straight line SL. Accordingly, the loop LP1 and the loop LP2 can easily have a shape symmetrical to each other with respect to the straight line SL.

A primary-side leakage reactance larger than an inductance value generated at connected parts of the inverter 20 and the transformers 30 and 40 (current paths, that is, the loops LP1 and LP2) can be provided in each of the transformers 30 and 40. Accordingly, it is possible to suppress the current imbalance of the transformers 30 and 40 because of a variation in the inductance generated in the connected parts of the inverter 20 and the transformers 30 and 40.

For example, the conductive lines L11 and L12 can include cables instead of the bus bars BB11 and BB12. Similarly, for example, the conductive lines L21 and L22 can include cables instead of the bus bars BB21 and BB22. Also in this case, when each of the cables is fixed to a predetermined member (for example, a casing of another apparatus), the loop LP1 and the loop LP2 with their areas being equal to each other can be formed on the respective sides of the straight line SL. Alternatively, when each of the cables is guided by a predetermined guide member (for example, a tube made of plastic), the loop LP1 and the loop LP2 with their areas being equal to each other can be formed on the respective sides of the straight line SL.

Figure 9:
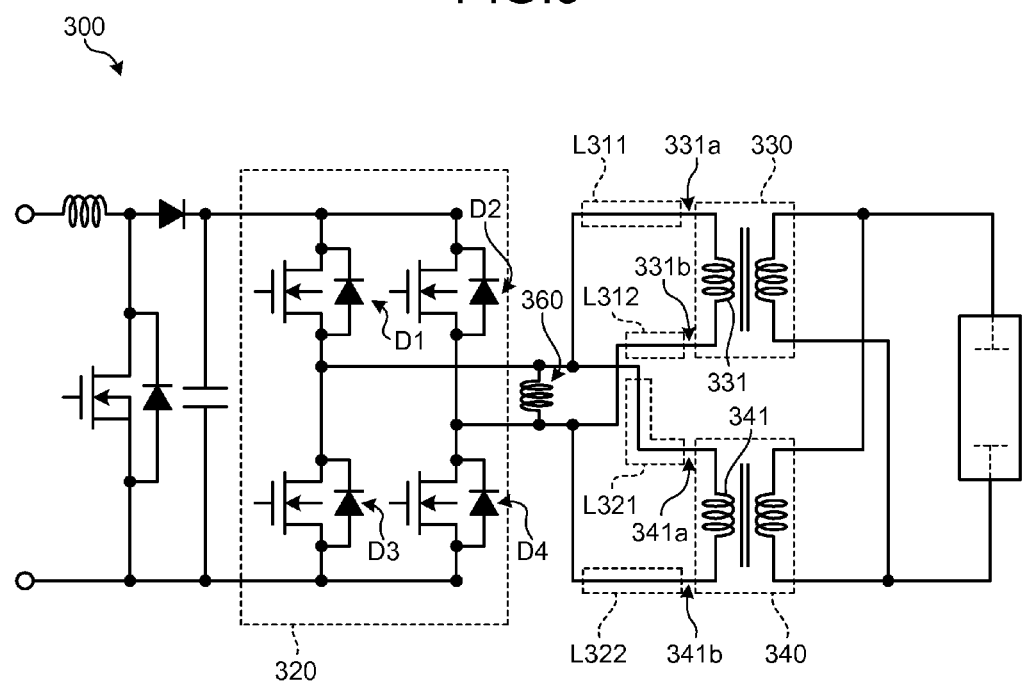
FIG. 9 depicts a configuration of the power supply apparatus according to the fourth embodiment.

The concept of the first embodiment can be applied to a case of a circuit configuration in which a reactor 360 is connected in parallel to transformers 330 and 340 on an output side of an inverter 320 as shown in FIG. 9. This case also exhibits effects same as those in the first embodiment. The reactor 360 is for preventing the diodes D1 to D4 of the inverter 320 from entering a recovery mode or reducing a frequency of the diodes D1 to D4 of the inverter 320 entering the recovery mode. When the diodes D1 to D4 enter the recovery mode and a recovery current flows in the diodes D1 to D4, abnormal heat generation may occur in the diodes D1 to D4.

Figure 3:
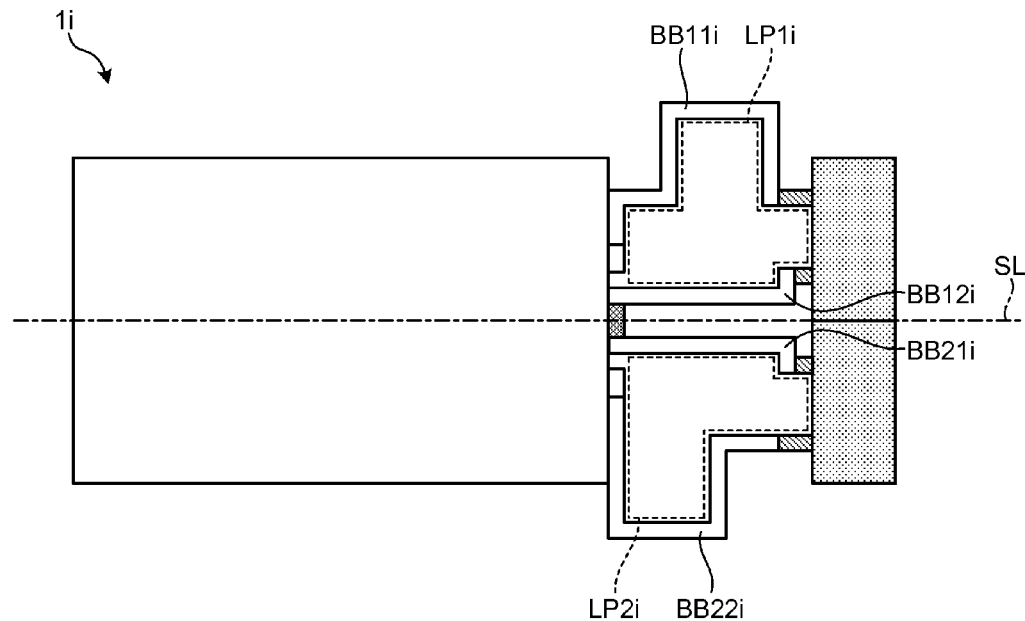
FIG. 3 depicts a configuration of a power supply apparatus according to a modification of the first embodiment.

As shown in FIG. 3, in a power supply apparatus 1$i$, two bus bars BB11$i$ and BB12$i$ and two bus bars BB21$i$ and BB22$i$ can be arranged at positions asymmetrical to each other with respect to the straight line SL on the respective sides of the straight line SL. Correspondingly, a loop LP1$i$ and a loop LP2$i$ can respectively have a shape symmetrical asymmetrical to each other with respect to the straight line SL. Also in this case, the area of the loop LP1$i$ is equal to the area of the loop LP2$i$. Accordingly, an inductance of the current path between the inverter 20 and the transformer 30 can be equal to an inductance of the current path between the inverter 20 and the transformer 40 and thus the current balance of the transformer 30 and the transformer 40 can be equal.

Figure 4:
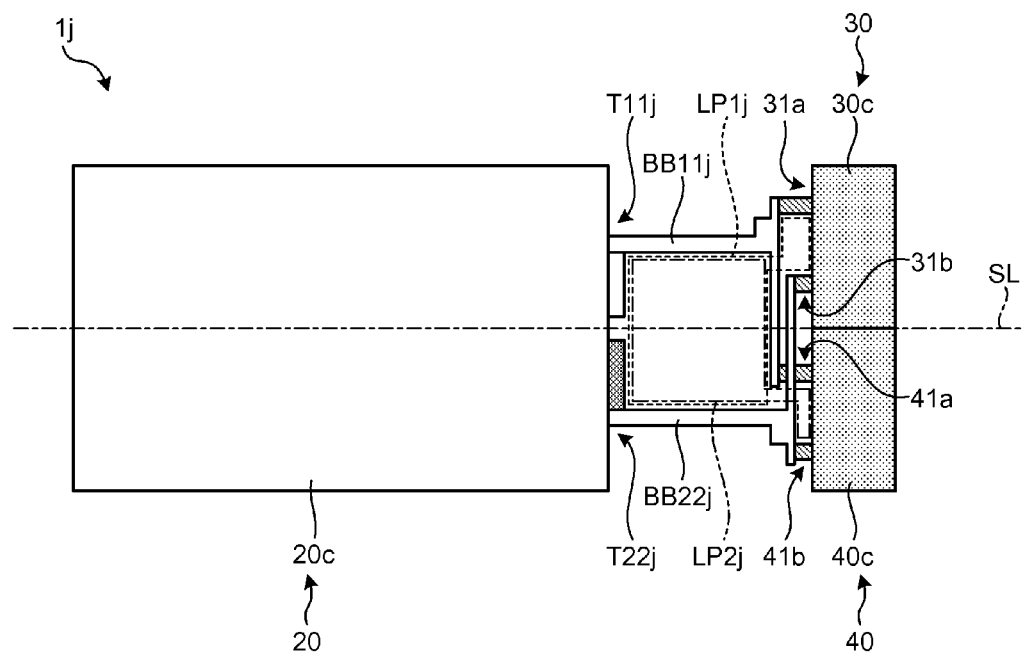
FIG. 4 depicts a configuration of a power supply apparatus according to another modification of the first embodiment.

Alternatively, as shown in FIG. 4, in a power supply apparatus 1$j$, two bus bars connecting the inverter 20 and the transformers 30 and 40 can be provided. That is, the bus bar BB11 and the bus bar BB21 can be standardized to a bus bar BB11$j$. This bus bar BB11$j$ connects the connection terminal 31$a$ of the transformer 30 and the connection terminal 41$b$ of the transformer 40 to an output terminal T11$j$ of the inverter 20 with the output terminals T11 and T21 being standardized thereto. For example, the bus bar BB11$j$ has a substantially L-shape as viewed from a plane. Similarly, the bus bar BB12 and the bus bar BB22 can be standardized to be a bus bar BB22$j$. This bus bar BB22$j$ connects the connection terminal 31$b$ of the transformer 30 and the connection terminal 41$a$ of the transformer 40 to an output terminal T22$j$ of the inverter 20 with the output terminals T12 and T22 being standardized thereto. For example, the bus bar BB22$j$ has a substantially L-shape as viewed from a plane. In this case, the amount of a material for forming bus bars can be reduced and manufacturing costs of the power supply apparatus 1$j$ can be reduced.

Also in this case, as shown in FIG. 4, the area of a loop LP1$j$ is equal to the area of a loop LP2$j$, and the loop LP1$j$ and the loop LP2$j$ respectively have a shape symmetrical to each other with respect to the straight line SL.

Second Embodiment

Figure 5:
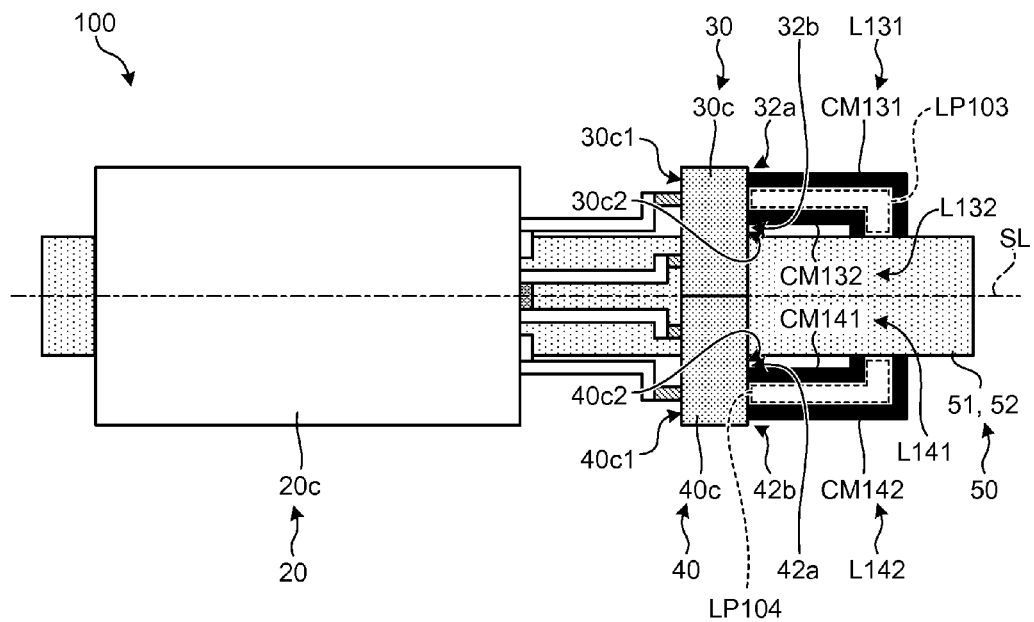
FIG. 5 depicts a configuration of a power supply apparatus according to a second embodiment.

A power supply apparatus 100 of a second embodiment is explained with reference to FIG. 5. FIG. 5 is a plan view of a part of an external configuration of the power supply apparatus 100 according to the second embodiment. In the following descriptions, elements different from the first embodiment are mainly explained.

The power supply apparatus 100 includes conductive lines L131 and L132 and conductive lines L141 and L142. FIG. 5 further depicts an external configuration for the conductive lines L131 and L132, the conductive lines L141 and L142 and the load device 50. With reference to FIG. 5, for the pair of the electrodes (discharge electrodes for laser excitation) 51 and 52 in the load device 50, two electrodes, that is, the electrode 51 shown in FIG. 5 and the electrode 52 arranged in parallel to the electrode 51 in a depth direction of a paper plane are provided, and these two electrodes constitute a pair of discharge electrodes. A discharge current flows in a path of the inverter→the bus bar→the transformer→the conductor member→the electrode 51→the electrode 52→the conductor member→the transformer→the bus bar→the inverter. For example, each of the electrodes 51 and 52 of the load device 50 extends along a direction of the straight line SL in a deeper direction of the paper plane than the inverter 20.

As shown in FIG. 5, the connection terminals 32a and 32b to both ends of the secondary-side coil 32 are arranged on a surface 30c2 of the casing 30c of the transformer 30 opposite to the surface 30c1, where the surface 30c1 faces the inverter 20. Similarly, the connection terminals 42a and 42b to both ends of the secondary-side coil 42 are arranged on a surface 40c2 of the casing 40c of the transformer 40 opposite to the surface 40c1, where the surface 40c1 faces the inverter 20.

The conductive lines L131 and L132 include conductor members CM131 and CM132, for example. Each of the conductor members CM131 and CM132 is a bar-shaped member made of a conductor such as metal. The conductor member CM131 connects the connection terminal 32a of the transformer 30 and the electrode 51 of the load device 50. The conductor member CM132 connects the connection terminal 32b of the transformer 30 and the electrode 52 of the load device 50. That is, the transformer 30 and the load device 50 are connected by these two conductor members CM131 and CM132. The two conductor members CM131 and CM132 extend alongside from the transformer 30 to the load device 50. Correspondingly, as shown by a broken line in FIG. 5, a loop LP103 is formed by the transformer 30, the conductor members CM131 and CM132, and the load device 50.

For example, the conductive lines L141 and L142 include conductor members CM141 and CM142. Each of the conductor members CM141 and CM142 is a bar-shaped member made of a conductor such as metal. The conductor member CM141 connects the connection terminal 42a of the transformer 40 and the electrode 51 of the load device 50. The conductor member CM142 connects the connection terminal 42b of the transformer 40 and the electrode 52 of the load device 50. That is, the transformer 40 and the load device 50 are connected by these two conductor members CM141 and CM142. The two conductor members CM141 and CM142 extend alongside from the transformer 40 to the load device 50. Correspondingly, as shown by a broken line in FIG. 5, a loop LP104 is formed by the transformer 40, the conductor members CM141 and CM142, and the load device 50.

As explained above, according to the second embodiment, current paths (the loop LP103 and the loop LP104) connecting the respective transformers and electrodes can be symmetrically configured to each other with respect to the straight line (the imaginary line) SL. For example, the loop LP103 and the loop LP104 can respectively have a substantially L-shape symmetrical to each other with respect to the straight line SL. Accordingly, in addition to inductances of the current paths between the inverter 20 and the transformers 30 and 40, inductances of the current paths between the transformers 30 and 40 and the load device 50 can be equal. The balance of currents flowing in two transformers can be further easily maintained to be equal.

While the above embodiments have exemplified a case of connecting two transformers 30 and 40 in parallel on the output side of the inverter 20, an even number of plural transformers can be connected in parallel on the output side of an inverter, and the same number of the transformers can be arranged on respective sides of a straight line (an imaginary line) breaking a pair of electrodes for laser excitation in two.

Third Embodiment

Figure 6:
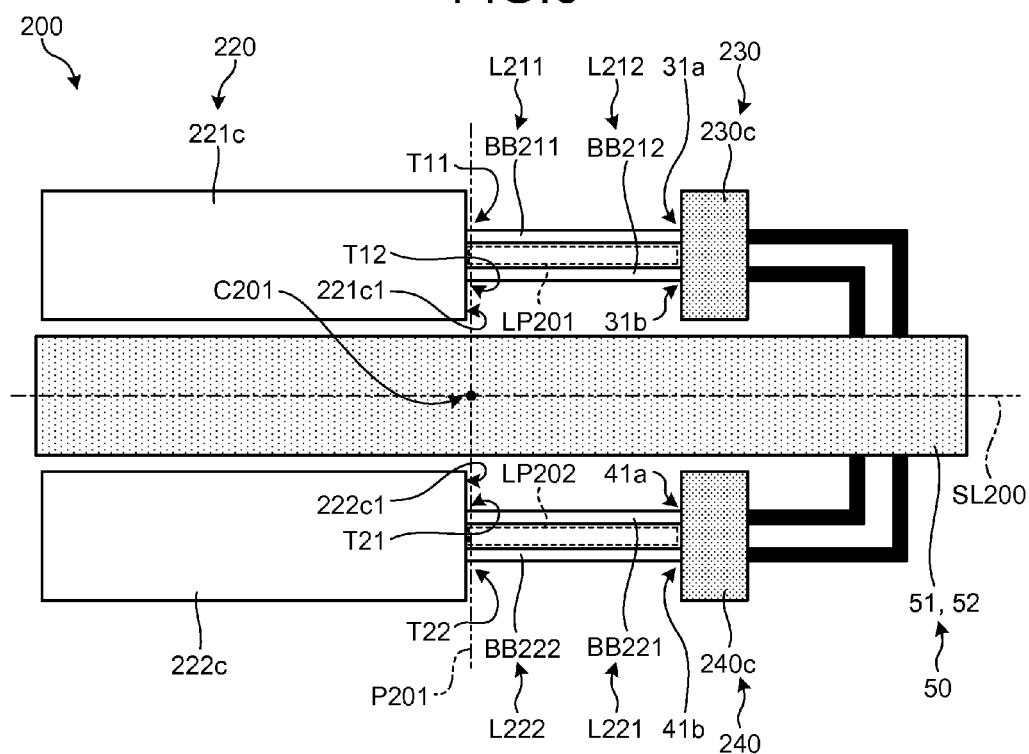
FIG. 6 depicts a configuration of a power supply apparatus according to a third embodiment.

A power supply apparatus 200 according to a third embodiment is explained with reference to FIG. 6. FIG. 6 is a plan view of a part of an external configuration of the power supply apparatus 200 according to the third embodiment. In the following descriptions, elements different from the second embodiment are mainly explained.

The power supply apparatus 200 includes an inverter 220, conductive lines L211 and L212, conductive lines L221 and L222, and transformers 230 and 240.

For example, the inverter 220 includes substantially rectangular parallelepiped casings 221c and 222c. The switching devices SW1 and SW2 and the diodes D1 and D2 (see FIG. 2) are incorporated in the casing 221c as a first reverse converter. The output terminals T11 and T12 are arranged on a surface 221c1 of the casing 221c, where the surface 221c1 faces the transformer 230. Similarly, the switching devices SW3 and SW4 and the diodes D3 and D4 (see FIG. 2) are incorporated in the casing 222c as a second reverse converter. The output terminals T21 and T22 are arranged on a surface 222c1 of the casing 222c, where the surface 222c1 faces the transformer 240. Furthermore, a straight line SL200 passes through a center C201 of the group of the output terminals T11 to T22 and also extends perpendicularly to a plane P201, which includes the group of the output terminals T11 to T22.

As shown in FIG. 6, the casings 221c and 222c are arranged at positions that are symmetrical to each other on respective sides of the straight line SL200 and do not overlap the electrodes 51 and 52 as view from a plane. Similarly, a casing 230c of the transformer 230 and a casing 240c of the transformer 240 are arranged at positions that are symmetrical to each other on the respective sides of the straight line SL200 and do not overlap the electrodes 51 and 52 as view from a plane. Correspondingly, the conductive lines L211 and L212 include bus bars BB211 and BB212 linearly extending along the straight line SL200. That is, the casing 221c of the inverter 220 and the casing 230c of the transformer 230 are connected by two substantially parallel bus bars BB211 and BB212. Correspondingly, as shown by a broken line in FIG. 6, a substantially rectangular loop LP201 is formed by the inverter 220, the bus bars BB211 and BB212, and the transformer 230.

Similarly, the conductive lines L221 and L222 include bus bars BB221 and BB222 linearly extending along the straight line SL200. That is, the casing 222c of the inverter 220 and the casing 240c of the transformer 240 are connected by two substantially parallel bus bars BB221 and BB222. Correspondingly, as shown by a broken line in FIG. 6, a substantially rectangular loop LP202 is formed by the inverter 220, the bus bars BB221 and BB222, and the transformer 240.

As explained above, according to the third embodiment, the inverter 220 is divided into the first reverse converter and the second reverse converter so as to correspond to the transformers 230 and 240 and the divided ones are arranged on the respective sides of the straight line SL. Correspondingly, the bus bars BB211 and BB212 and the bus bars BB221 and BB222 arranged on the respective sides of the straight line SL can be made linear. Accordingly, the loop LP201 and the loop LP202 can be more easily configured to be symmetrical to each other with respect to the straight line SL200.

Figure 7:
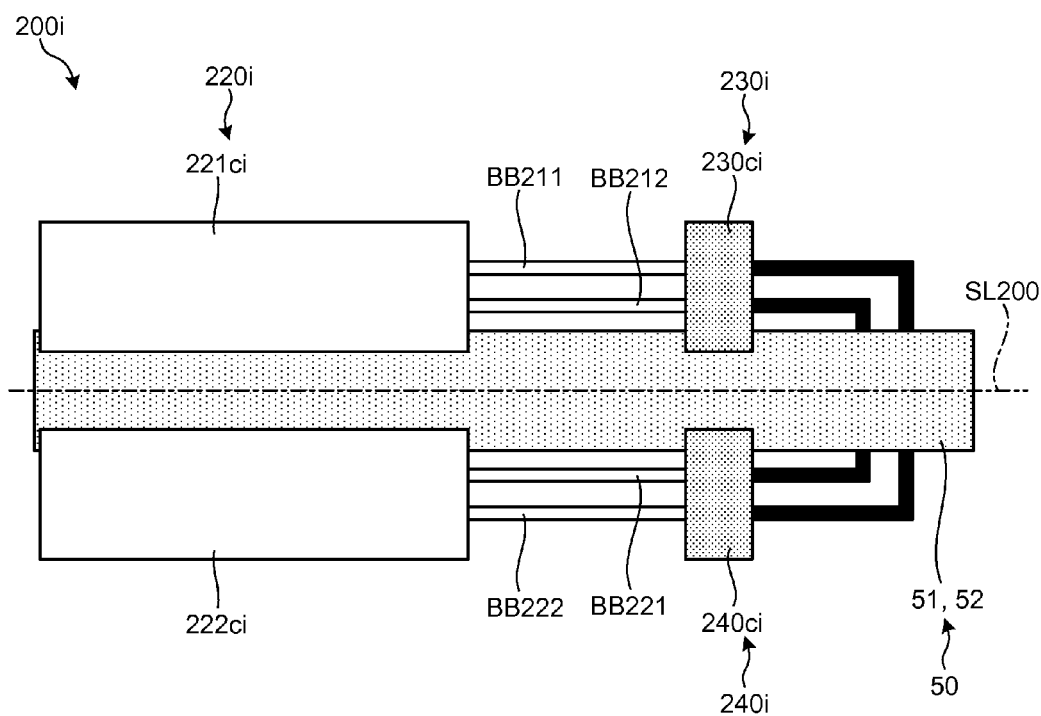
FIG. 7 depicts a configuration of a power supply apparatus according to a modification of the third embodiment.

As shown in FIG. 7, in a power supply apparatus 200*i*, a plurality of casings 221*ci* and 222*ci* of an inverter 220*i* can be arranged at positions that are symmetrical to each other on the respective sides of the straight line SL200 and can partially overlap the electrodes 51 and 52 as viewed from a plane. Further, a casing 230*ci* of a transformer 230*i* and a casing 240*ci* of a transformer 240*i* can be arranged at positions that are symmetrical to each other on the respective sides of the straight line SL200 and can partially overlap the electrodes 51 and 52 as viewed from a plane. Also in this case, because the casings 221*ci* and 222*ci* and the casings 230*ci* and 240*ci* are arranged at corresponding positions on the respective sides of the straight line SL200, the respective bus bars BB211 and BB212 and the respective bus bars BB221 and BB222 arranged on the both sides of the straight line SL200 can be formed linearly.

Fourth Embodiment

Figure 8:
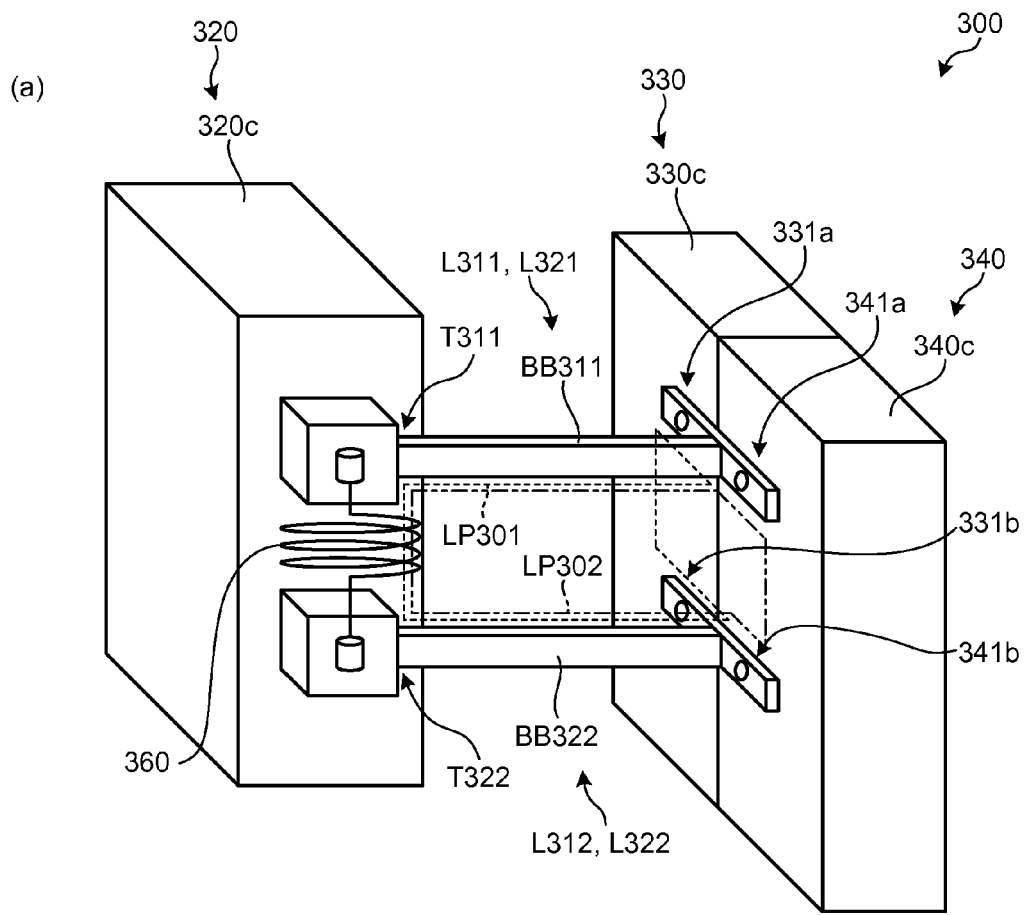
FIG. 8 depicts a configuration of a power supply apparatus according to a fourth embodiment.
Figure 8:
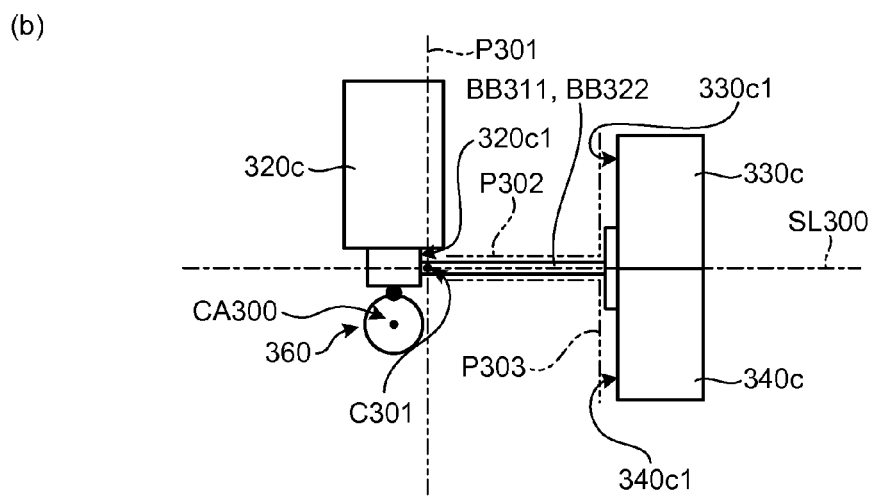

A power supply apparatus 300 according to a fourth embodiment is explained next with reference to FIGS. 8 and 9. FIG. 8(*a*) is a perspective view of a part of an external configuration of the power supply apparatus 300 according to the fourth embodiment. FIG. 8(*b*) is a plan view of a part of the external configuration of the power supply apparatus 300 according to the fourth embodiment. FIG. 9 depicts a circuit configuration of the power supply apparatus 300 according to the fourth embodiment. In the following descriptions, elements different from the modification of the first embodiment are mainly explained.

The power supply apparatus 300 includes the inverter 320, a plurality of conductive lines L311 to L322, the transformers 330 and 340, and the reactor 360.

A group of output terminals T311 and T322 is arranged on a surface 320*c*1 of the casing 320*c* of the inverter 320, where the surface 320*c*1 faces the transformer 330 and the transformer 340. The respective output terminals T311 and T322 are arranged at positions that overlap a straight line SL300 as viewed from a plane (see FIG. 8(*b*)) and are shifted from each other along a central axis CA300 of the reactor 360. The straight line SL300 passes through a center C301 of the group of the output terminals T311 and T322 and also extends perpendicularly to a plane P301 including the group of the output terminals T311 and T322.

Connection terminals 331*a* and 331*b* to both ends of a primary-side coil 331 are arranged on a surface 330*c*1 of the casing 330*c* of the transformer 330, where the surface 330*c*1 faces the inverter 320. The respective connection terminals 331*a* and 331*b* are arranged at positions shifted from each other along the central axis CA300 of the reactor 360. Similarly, connection terminals 341*a* and 341*b* to both ends of a primary-side coil 341 are arranged on a surface 340*c*1 of the casing 340*c* of the transformer 340, where the surface 340*c*1 faces the inverter 320. The respective connection terminals 341*a* and 341*b* are arranged at positions shifted from each other along the central axis CA300 of the reactor 360.

The conductive lines L311 to L322 include bus bars BB311 and BB322, for example. The bus bar BB311 and the bus bar BB322 are arranged at positions that overlap the straight line SL300 as viewed from a plane (see FIG. 8(*b*)) and are shifted from each other along the central axis CA300 of the reactor 360. The bus bar BB311 and the bus bar BB322 has a substantially T-shape as viewed from a plane, for example. Correspondingly, as shown by a broken line in FIG. 8(*a*), a plate-shaped loop LP301 bent in a substantially L-shape is formed by the inverter 320, the bus bars BB311 and BB322, and the transformer 330. As shown by a two-dot chain line in FIG. 8(*a*), a plate-shaped loop LP302 bent in a substantially L-shape is formed by the inverter 320, the bus bars BB311 and BB322, and the transformer 340. In addition, the present embodiment is same as the modification of the first embodiment in features such that the bus bar BB311 is provided by standardizing the bus bar BB11 and the bus bar BB21 (see FIG. 1) and the bus bar BB322 is provided by standardizing the bus bar BB12 and the bus bar BB22 (see FIG. 1).

As shown in FIG. 9, the reactor 360 is connected in parallel to the transformers 330 and 340 on the output side of the inverter 320. That is, the reactor 360 is connected to the group of the output terminals T311 and T322 in parallel to the transformer 330 and the transformer 340 as shown in FIG. 8(*a*). Every time when a current flows in the reactor 360, a magnetic flux is generated parallel to the central axis CA300 of the reactor 360. As explained above, the reactor 360 prevents the diodes D1 to D4 of the inverter 320 from entering the recovery mode or reducing a frequency of the diodes D1 to D4 of the inverter 320 entering the recovery mode.

As shown in FIG. 8(*b*), each of the loops LP301 and LP302 described above are arranged in planes P302 and P303 that respectively extend in a direction along the central axis CA300 of the reactor 360. That is, the reactor 360 is arranged at a position that a magnetic flux generated by the reactor 360 is not interlinked with the respective loops LP301 and LP302. The plane P302 extends, as viewed from a plane, from the inverter 320 to the transformer 330 along the straight line SL300 and then extends along the surface 330*c*1 of the transformer 330 to be away from the straight line SL300. The plane P303 extends, as viewed from a plane, from the inverter 320 to the transformer 340 along the straight line SL300 and then extends along the surface 340*c*1 of the transformer 340 to be away from the straight line SL300.

It is assumed here that the loops LP301 and LP302 are arranged in planes extending in a direction crossing the central axis CA300 of the reactor 360. In this case, when the magnetic flux generated by the reactor 360 is interlinked with a current path between an inverter and a transformer (the loop LP301 or LP302), a voltage is induced in that current path and the balance of currents flowing in the respective transformers may be lost.

On the contrary, according to the fourth embodiment, the loops LP301 and LP302 are arranged in the planes P302 and P303 extending in a direction along the central axis CA300 of the reactor 360, respectively. That is, the reactor 360 is arranged at the position that the magnetic flux generated by the reactor 360 is not interlinked with the respective loops LP301 and LP302. For example, the reactor 360 is arranged so that the central axis CA300 of the reactor 360 is skewed with respect to a longitudinal direction of the respective bus bars BB311 and BB322. Accordingly, a magnetic flux generated by a current flowing in the reactor 360 is less interlinked with the loops LP301 and LP302 and thus induction of a voltage in the current path between an inverter and a transformer (the loop LP301 or LP302) by the magnetic flux generated in the reactor 360 can be suppressed and loss of the balance of currents flowing in the respective transformers can be reduced.

While FIGS. 8(*a*) and 8(*b*) exemplify a case where the reactor 360 connected to the output side of the inverter 320 is arranged so that its central axis CA300 is arranged at a position skewed with respect to the longitudinal direction of the bus bars BB311 and BB322 between the inverter and the transformers, it is not limited to the skewed position. It suffices that the reactor 360 is arranged at a position where the magnetic flux generated by the reactor 360 is not interlinked with the loops LP301 and LP302.

Fifth Embodiment

Figure 10:
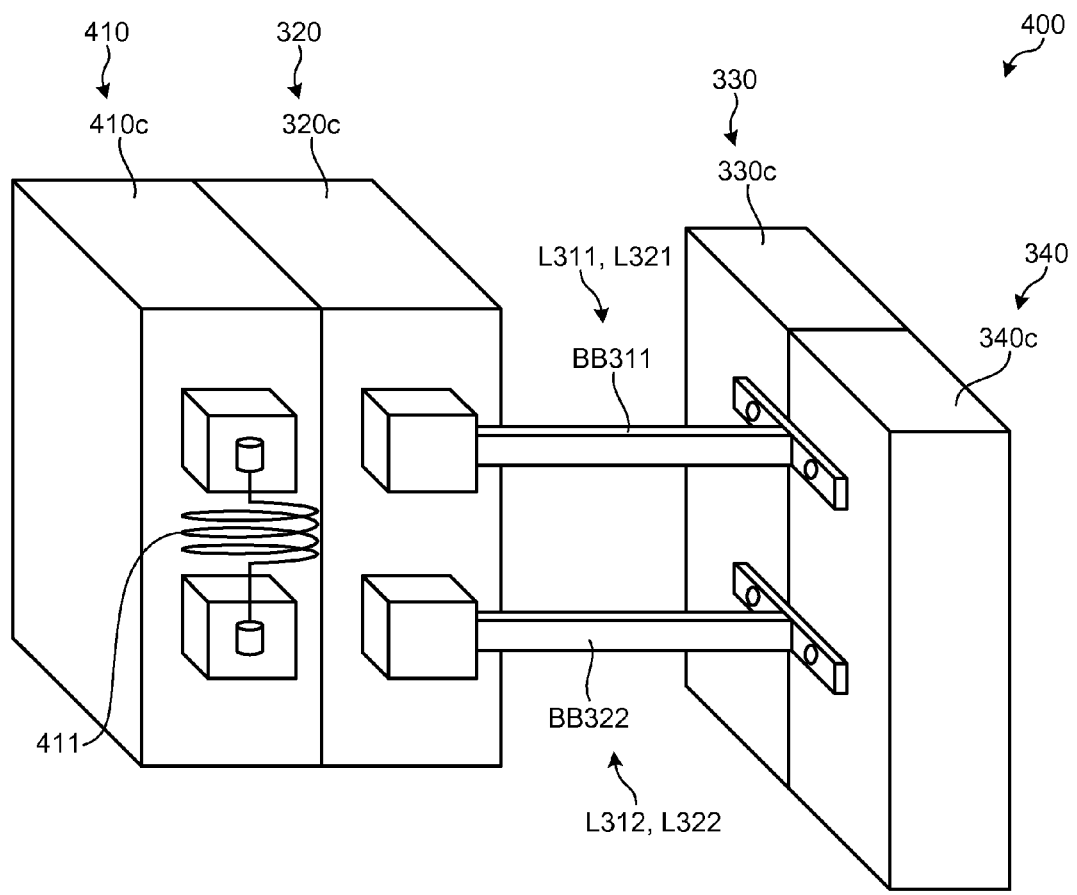
FIG. 10 depicts a configuration of a power supply apparatus according to a fifth embodiment.

Next, a power supply apparatus 400 according to a fifth embodiment is explained with respect to FIG. 10. FIG. 10 is a perspective view of a part of an external configuration of the power supply apparatus 400 according to the fifth embodiment. In the following descriptions, elements different from the fourth embodiment shown in FIG. 9 are mainly explained.

The power supply apparatus 400 includes a boost chopper circuit 410. The boost chopper circuit 410 includes a reactor 411 corresponding to the reactor 11 (see FIG. 2). As shown in FIG. 10, the boost chopper circuit 410 includes a substantially rectangular parallelepiped casing 410c, for example. The reactor 411 is arranged outside the casing 410c. Every time when a current flows in the reactor 411, a magnetic flux is generated parallel to a central axis of the reactor 411 (a central axis extending in the same direction as that of the central axis CA300 shown in FIG. 8(*b*)).

According to the fifth embodiment, each of the loops LP301 and LP302 (see FIG. 8(*a*)) is arranged in the planes P302 and P303 extending in a direction along the central axis of the reactor 411. That is, the reactor 411 is arranged at a position where the magnetic flux generated by the reactor 411 is not interlinked with the respective loops LP301 and LP302. For example, the reactor 411 is arranged so that the central axis of the reactor 411 is skewed with respect to the longitudinal direction of the respective bus bars BB311 and BB322. Accordingly, a magnetic flux generated by the current flowing in the reactor 411 is less interlinked with the loops LP301 and LP302. Consequently, induction of a voltage in a current path between an inverter and a transformer (the loop LP301 or LP302) by the magnetic flux generated in the reactor 411 can be suppressed and loss of the balance of currents flowing in the respective transformers can be reduced.

While the reactor 360 is not shown in FIG. 10, similarly to the fourth embodiment, the reactor 360 can be arranged outside the casing 320c of the inverter 320.

In the first to fifth embodiments described above, while a case in which a switching device and a diode in a boost chopper circuit and an inverter are made of silicon as an example has been explained, the switching device and the diode can be made of a wide bandgap semiconductor with a larger bandgap than that of silicon. Examples of the wide bandgap semiconductor include silicon carbide, gallium nitride, and diamond.

Because a switching device and a diode made of such a wide bandgap semiconductor have a high voltage resistance and a high allowable current density, the switching device and the diode device can be downsized. By using these downsized switching device and diode device, a semiconductor module having these devices incorporated therein can be downsized.

Because a high heat resistance is also provided, a radiation fin of a heat sink can be downsized and a water cooling unit can be cooled by air, and thus the semiconductor module can be further downsized.

Furthermore, because power loss is reduced, efficiency of the switching device and the diode can be increased and thus efficiency of the semiconductor module can be increased. For example, when the switching device and the diode are used under the same conditions as in the case where the switching device and the diode are made of silicon, temperature of a boost chopper circuit and an inverter incorporated in a power supply board can be reduced. Therefore, the amount of heat transmitted from the boost chopper circuit and the inverter via the power supply board to a transformer can be reduced. Consequently, an increase in the temperature of the transformer incorporated in the power supply board can be suppressed.

While it is desirable that both the switching device and the diode are made of a wide bandgap semiconductor, it also suffices that one of the devices is made of a wide bandgap semiconductor, and even in this case, effects explained in the above embodiments can be obtained.

INDUSTRIAL APPLICABILITY

As described above, the power supply apparatus according to the present invention is suitable for a power supply apparatus of a gas-laser oscillator.

REFERENCE SIGNS LIST

1 Power Supply Apparatus
1*i* Power Supply Apparatus
1*j* Power Supply Apparatus
10 Boost Chopper Circuit
12 Switching Device
13 Diode
14 Diode
20 Inverter
30 Transformer
40 Transformer
50 Load Device
51 Electrode
52 Electrode
100 Power Supply Apparatus
200 Power Supply Apparatus
200*i* Power Supply Apparatus
220 Inverter
220*i* Inverter
230 Transformer
230*i* Transformer
240 Transformer
240*i* Transformer
300 Power Supply Apparatus
320 Inverter
330 Transformer
340 Transformer
360 Reactor
400 Power Supply Apparatus
410 Boost Chopper Circuit
411 Reactor
BB11 to BB22 Bus Bar
BB11*i* to BB22*i* Bus Bar
BB11*j* to BB22*j* Bus Bar
BB211 to BB222 Bus Bar
BB311 to BB322 Bus Bar
CM131 to CM142 Conductor Member
D1 to D4 Diode
L11 to L42 Conductive Line
L131 to L142 Conductive Line
L211 to L222 Conductive Line
L311 to L322 Conductive Line
LP1, LP2 Loop
LP1*i*, LP2*i* Loop
LP1*j*, LP2*j* Loop
SL Straight Line
SL200 Straight Line
SW1 to SW4 Switching Device
T11 to T22 Output Terminal
T11*j* to T22*j* Output Terminal
T311 to T322 Output Terminal

The invention claimed is:

1. A power supply apparatus comprising:
an inverter that includes a group of output terminals, generates alternating-current power from direct-current power, and outputs generated power from the group of output terminals;
a first transformer that transforms alternating-current power output from the group of output terminals;
a second transformer that is connected to the group of output terminals in parallel to the first transformer, arranged on an opposite side of the first transformer with respect to a straight line passing through a center of the group of output terminals and extending perpendicularly to a plane including the group of output terminals, and transforms alternating-current power output from the group of output terminals;
a plurality of first conductive lines that connect the group of output terminals and both ends of the first transformer; and
a plurality of second conductive lines that connect the group of output terminals and both ends of the second transformer, wherein
an area of a first loop formed by the inverter, the first conductive lines, and the first transformer is equal to an area of a second loop formed by the inverter, the second conductive lines, and the second transformer.

2. The power supply apparatus according to claim 1, wherein the first loop and the second loop respectively have a shape symmetrical to each other with respect to the straight line.

3. The power supply apparatus according to claim 1, further comprising:
a load device that receives alternating-current power transformed by the first transformer and alternating-current power transformed by the second transformer;
a plurality of third conductive lines that connect both ends of the first transformer and both ends of the load device; and
a plurality of fourth conductive lines that connect both ends of the second transformer and both ends of the load device, wherein
an area of a third loop formed by the first transformer, the third conductive lines, and the load device is equal to an area of a fourth loop formed by the second transformer, the fourth conductive lines, and the load device.

4. The power supply apparatus according to claim 1, wherein
the inverter includes
a first reverse converter that includes a first group of output terminals included in the group of output terminals, generates alternating-current power from direct-current power, and outputs generated power from the first group of output terminals, and
a second reverse converter that includes a second group of output terminals included in the group of output terminals, is arranged on an opposite side of the first reverse converter with respect to the straight line, generates alternating-current power from direct-current power, and outputs generated power from the second group of output terminals, and wherein
the first transformer transforms alternating-current power output from the first group of output terminals,
the second transformer transforms alternating-current power output from the second group of output terminals,
the first loop is formed by the first reverse converter, the first conductive lines, and the first transformer, and
the second loop is formed by the second reverse converter, the second conductive lines, and the second transformer.

5. The power supply apparatus according to claim 1, further comprising a reactor that is connected to the group of output terminals in parallel to the first transformer and the second transformer, wherein
the first loop and the second loop are arranged respectively in planes extending in a direction along a central axis of the reactor.

6. The power supply apparatus according to claim 1, further comprising a converter that includes a second reactor, generates direct-current power from alternating-current power by using the second reactor, and outputs generated power to the inverter, wherein
the first loop and the second loop are arranged respectively in planes extending in a direction along a central axis of the second reactor.

7. The power supply apparatus according to claim 1, wherein
the inverter includes a switching device and a diode device, and
at least one of the switching device and the diode device is made of a wide bandgap semiconductor.

8. The power supply apparatus according to claim 6, wherein
the converter includes a switching device and a diode device, and
at least one of the switching device and the diode device is made of a wide bandgap semiconductor.

* * * * *